United States Patent [19]

Tanabe et al.

[11] 4,237,181
[45] Dec. 2, 1980

[54] METHOD OF MANUFACTURING A FLEXIBLE POLYURETHANE FOAM PRODUCT

[75] Inventors: Nato Tanabe, Takatsuki; Kenzoh Okada; Norio Maeda, both of Neyagawa, all of Japan

[73] Assignee: Kurashiki Boseki Kabushiki Kaisha, Okayama, Japan

[21] Appl. No.: 921,171

[22] Filed: Jun. 30, 1978

[30] Foreign Application Priority Data

Jul. 4, 1977 [JP] Japan .................... 52-80282

[51] Int. Cl.³ .................... B32B 5/18; B32B 3/26; B32B 31/16
[52] U.S. Cl. .................... 428/307; 118/57; 156/73.1; 156/73.6; 156/283; 156/291; 427/57; 427/180; 427/244; 427/346; 428/206; 428/306
[58] Field of Search .................... 118/57; 156/73.1, 73.6, 156/283, 291; 427/57, 243, 346, 347, 244, 180; 428/206, 306, 307

[56] References Cited

U.S. PATENT DOCUMENTS

| 3,966,519 | 6/1976 | Mitchell et al. | 156/73.1 |
| 4,096,016 | 6/1978 | Pohl | 156/274 |

FOREIGN PATENT DOCUMENTS 749907 1/1967 Canada ........................ 427/57
854674 10/1970 Canada .
50-76181 6/1975 Japan .

OTHER PUBLICATIONS

Stokes et al., "Applications of Sonic Energy in the Process Industries", Ultrasonic-Two Symposia, A.I.Ch.E., New York, 1951. p. 11.

Primary Examiner—John T. Goolkasian
Assistant Examiner—Robert A. Dawson
Attorney, Agent, or Firm—Wenderoth, Lind & Ponack

[57] ABSTRACT

A method of manufacturing a patterned cushioning product of flexible polyurethane foam, which is suitable for use as a flooring or carpetting material, wall lining material or any other surface finishing or lying material, which is manufactured by the application of high frequency vibrations necessary to cause thermally fusible bonding particles to permeate into an open-celled structure of a sheet of flexible polyurethane foam and then fushion-bonding surface covering sheets to the opposed surfaces of the polyurethane foam sheet.

6 Claims, 3 Drawing Figures

METHOD OF MANUFACTURING A FLEXIBLE POLYURETHANE FOAM PRODUCT

BACKGROUND OF THE INVENTION

The present invention relates to a method of manufacturing a flexible polyurethane foam product and, more particularly, to a method of manufacturing a patterned cushioning product of flexible polyurethane foam comprising a sheet of flexible polyurethane foam and surface covering sheets fusion-bonded respectively to the opposed surfaces of the polyurethane foam sheet, which product is generally known as a weldable pad material suitable for use as a flooring or carpetting material, wall lining material or any other surface finishing or lying material.

As is well known to those skilled in the art, a flexible polyurethane foam is now commercially available in two types depending upon the pattern of distribution of the gas phase in voids or pockets which are generally called cells. One type of flexible polyurethane foam is of open-celled structure wherein the cells are interconnected in such a manner that gas may pass from one to another, whereas the other type is of closed-celled structure wherein the cells are discrete and the gas phase of each is independent of that of the other cells. Of these two types, the flexible polyurethane foam of open-celled structure is applicable in the method of the present invention.

There is known a method of manufacturing a patterned cushioning product of polyurethane foam of open-celled structure which comprises the steps of permeating a powder of thermally fusible bonding agent locally into the open-celled structure of a flexible polyurethane foam sheet, applying a heat of a temperature approximating to the melting point of the thermally fusible bonding agent to fix the particles of the bonding agent in the open-celled structure of the flexible polyurethane foam sheet, and fusion-bonding surface covering sheets to the opposed surfaces of the flexible polyurethane foam sheet while a portion of the assembly where bonding is desired to be effected is applied with a pressure.

The above described method is substantially disclosed in the Japanese Patent Laid-open Publication published on June 21, 1975 under No. 50-76181 and, according to it, three processes have been discussed as to a method of permeating the particles of the powdery bonding agent into the open-celled structure, that is, the interconnected cells, of the flexible polyurethane foam sheet, namely, to vibrate the flexible polyurethane foam sheet to allow the bonding particles previously spread over one surface of the polyurethane foam sheet to permeate into the open-celled structure; to employ a high pressure necessary to drive the bonding particles into the open-celled structure of the polyurethane foam sheet in a direction in which the high pressure is applied; and to employ a suction force necessary to draw the bonding particles into the open-celled structure from one of the opposed surfaces of the polyurethane foam sheet towards the other in a direction in which air is drawn.

Both of the last two processes require the employment of a relatively large amount of the powdery bonding agent and correspondingly a recovery equipment for recovering some of the powdery bonding agent which has completely passed through the thickness of the polyurethane foam sheet. Moreover, in the practice of any of these permeating processes, some of the powdery bonding agent permeated into the open-celled structure of the polyurethane foam sheet tend to aggregate in localized areas adjacent the opposed side edges of the polyurethane foam sheet and, therefore, uniform distribution of the bonding particles in the open-celled structure of the polyurethane foam sheet can hardly be achieved with no difficulty.

In view of the above, when the polyurethane foam sheet permeated with the bonding particles is, during the subsequent manufacturing procedure, subjected to a high frequency bonding process wherein the surface covering sheets are bonded thereto by the application of high frequency waves, the resultant flexible polyurethane foam product shows that side portions thereof corresponding to the localized areas of the polyurethane foam sheet where some of the bonding particles have been aggregated are hardened with physical properties intrinsic of the polyurethane foam, particularly, the impact resilience, being reduced accordingly.

SUMMARY OF THE INVENTION

Accordingly, the present invention has been made in view to substantially eliminating the disadvantages and inconveniences inherent in the conventional method described above and is intended to provide an improved method wherein the powdery bonding agent can advantageously be uniformly distributed in the open-celled structure widthwise of the polyurethane foam sheet by the application of high frequency vibrations.

Another object of the present invention is to provide an improved method of the type referred to above, which does not substantially require the use of a relatively complicated and bulky equipment in the practice of the method of the present invention.

It is a related object of the present invention to provide a patterned cushioning product of flexible polyurethane foam manufactured by the method of the present invention.

According to the present invention, high frequency vibrations are applied to a sheet of flexible polyurethane foam of open-celled structure having one surface on which a powder of thermally fusible bonding agent has been spread in a desired pattern or configuration, thereby causing the bonding particles to permeate into the open-celled structure of the polyurethane foam sheet uniformly. Then, a heat of a temperature slightly higher than the melting point of the thermally fusible bonding agent is applied to the polyurethane foam sheet to fix the bonding powder within the open-celled structure and, subsequently, surface covering sheets are applied on respective surfaces of the polyurethane foam sheet.

In order to bond the surface covering sheets to the opposed surfaces of the polyurethane foam sheet thereby to provide the final product, high frequency waves are applied to a portion of the assembly of these sheets where corresponds to the position of the bonding agent permeated in the open-celled structure of the polyurethane foam sheet.

It is to be noted that the thermally fusible bonding agent which may be employed in the present invention is a powder of thermally fusible synthetic resin having a relatively high dielectric loss, such as polyvinyl chloride, vinylidene chloride or nylon copolymer having a relatively low melting point.

As a source of vibrations required to cause the bonding particles to permeate into the open-celled structure of the polyurethane foam sheet, either an ultrasonic generator of a construction having a horn and a vibrating plate capable of undergoing flexure vibrations according to the generated ultrasonic or an electromechanical vibrator may be employed. Preferably, the frequency and amplitude of the vibrations are respectively within the range of 1,000 to 50,000 Hz and within the range of 5 to 100 μm and, where the vibrations of a relatively high frequency within the above described frequency range are desired, the use of the ultrasonic generator is recommended while, where the vibrations of a relatively low frequency are desired, the use of the electromechanical vibrator is recommended. This is particularly advantageous in that any possible dispersion of some of the bonding particles in the open-celled structure of the polyurethane foam sheet in a direction parallel to any one of the surfaces of the polyurethane foam sheet can be substantially avoided and that the bonding particles can be permeated into the open-celled structure uniformly in a direction parallel to the direction of thickness of the polyurethane foam sheet to assume a configuration matching to the pattern in which the bonding particles have been spread. This is possible because the powdery particles are accelerated by the vibration energies to permeate into the polyurethane foam sheet mainly in a direction parallel to the direction of thickness of said polyurethane foam sheet while local vibration of the polyurethane foam sheet is minimized.

In the practice of the method of the present invention, the amount of energies of vibration is to be determined by the relationship between the frequency and the amplitude of vibrations generated by the source of vibration and are to be selected in consideration of the density of cells in the polyurethane foam sheet, the thickness of the polyurethane sheet, and/or the type and size of the powdery bonding particles used. More specifically, where the vibrations of relatively high frequency within the above described frequency range are desired, they should have a relatively low amplitude within the above described amplitude range while, where the vibrations of relatively low frequency within the above described frequency range are desired, they should have a relatively high amplitude within the above described amplitude range.

It is to be noted that, if the frequency of the vibrations is lower than the lowermost limit of 1,000 Hz, such vibrations must have a considerably high amplitude in order for the bonding particles to be sufficiently permeated into the open-celled structure of the polyurethane foam sheet and the use of the considerably high amplitude at the lower frequency would result in scattering of some of the bonding particles in a direction parallel to any one of the opposed surfaces of the polyurethane foam sheet and also in uneven distribution of the bonding particles into the open-celled structure of the polyurethane foam sheet. On the other hand, if the frequency of the vibrations is higher than the uppermost limit of 50,000 Hz, vibrations of high amplitude can hardly be produced and, therefore, no sufficient permeation of the bonding particles into the open-celled structure of the polyurethane foam sheet can be achieved.

The source of vibration to be used in the practice of the method of the present invention includes a vibrating element which may be in the form of either a plate or a rod to be selected depending upon the type of the heat fusion used and which is applied under a slight pressure to a layer of the bonding particles on one surface of the polyurethane foam sheet during the application of the vibrations so that the bonding particles can readily permeate into the open-celled structure of the polyurethane foam sheet.

In order to spread the bonding particles on the surface of the polyurethane foam sheet prior to the application of the vibrations, any known method may be employed. By way of example, a mass of the bonding particles may be spread on the surface of the polyurethane foam sheet by the use of a doctor knife after a templet having a desired pattern defined therein has been placed on the surface of the polyurethane foam sheet. Alternatively, the spreading of the bonding particles may be effected by the use of a screw feeder capable of quantitatively supplying the bonding particles onto the surface of the polyurethane foam sheet through a supply nozzle so shaped as to assume the desired pattern.

BRIEF DESCRIPTION OF THE DRAWINGS

These and other objects and features of the present invention will become apparent from the following description taken by way of example with reference to the accompanying drawings, in which.

DETAILED DESCRIPTION OF THE INVENTION

Example I

Figure 1:
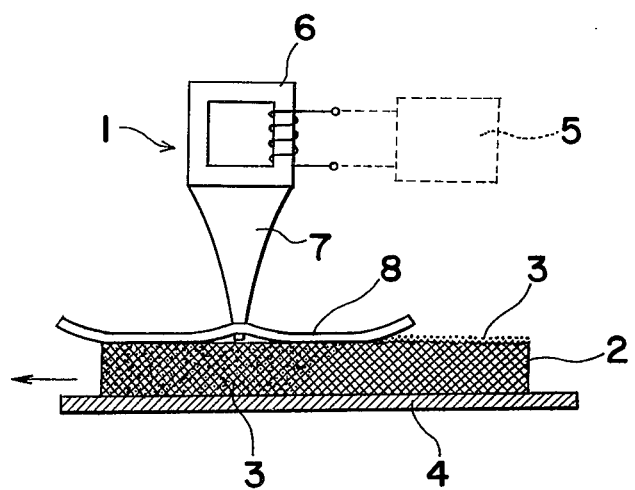
FIG. 1 is a schematic diagram showing the use of a supersonic generator as a source of vibration in the practice of the method of the present invention.

A weldable pad material suitable for use in an interior lining in an automobile compartment was manufactured by the use of an ultrasonic generator 1 of a construction shown in FIG. 1. The ultrasonic generator 1 comprises an electric oscillator 5, a magnetostrictive vibrating element 6, an exponential horn 7 and a vibrating plate 8 made of juralumin and secured to one end of the horn 7 remote from the magnetostrictive vibrating element 6. The vibrating plate 8 employed was 1 mm. in thickness, 260 mm. in length and 100 mm. in width.

A sheet 2 of flexible polyurethane foam of open-celled structure, having a thickness of 10 mm. and a specific gravity of 0.02 g/cm$^3$, was first placed on a moving support 4 driven in one direction, as indicated by the arrow in FIG. 1, at a speed of 1.5 m/min. and, while the polyurethane foam sheet 2 was so transported together with the support 4, a powder 3 of thermally fusible bonding agent which was employed in the form of a low melting point nylon copolymer manufactured by Dicel Co., Ltd. of Japan under a tradename "DIAMIDE T 650 P1" (Melting point: 120° C., Particle size: not more than 100 μm) was spread over one surface of the polyurethane foam sheet 2 to form thereon a localized layer of bonding agent having a width of 20 mm. Then, the vibrating plate 8 capable of producing a stripes-patterned mode of vibration was applied under a slight pressure to the bonding layer on the surface of the polyurethane foam sheet 2 and, upon application of vibrations having a frequency of 19,750 Hz and an amplitude of 10 μm to the vibrating plate 8, particles of the bonding agent satisfactorily permeated into the open-celled structure of the polyurethane foam sheet 2 in a predetermined width equal to the width of the layer of the bonding agent which had been spread on the surface of the polyurethane foam sheet 2 prior to the application of the vibrations through the vibrating plate 8. No aggregation of the bonding particles in a stripes pattern within the open-celled structure of the polyurethane foam sheet 2 did not occur because the polyurethane foam sheet 2 was moved together with the support 4 during the application of the vibration from the vibration source 1.

The polyurethane foam sheet 2 with the powdery bonding agent 3 permeated therein was thereafter heated at 150° C. for 3 minutes within a heating oven to allow the particles of the bonding agent to be fixed in the open-celled structure of the polyurethane foam sheet 2. After removal of the polyurethane foam sheet 2 out of the heating oven, a web of nylon tricot 21 and a web of nonwoven nylon fabric 22, both as the surface covering sheets, were applied to the opposed surfaces of the polyurethane foam sheet 2 and, while the polyurethane foam sheet 2 had been sandwiched between these webs 21 and 22, the asembly was heated in a predetermined configuration by the application of high frequency waves through a templet for 10 seconds to fusion-bond the surface covering sheets 21 and 22 to the respective surfaces of the polyurethane foam sheet 2, said templet having a shape identical with the above described pattern or configuration and being 2.5 mm. in width and 22.5 cm² in total surface area. During the application of the high frequency waves, a high frequency welder having a rated output of 3 KW and capable of generating a high frequency wave of 40.46 MHz was operated with a current of 0.4 A.

After the application of the high frequency waves and, consequently, the fusion-bonding of the surface covering sheets 21 and 22 to the polyurethane foam sheet 2, the assembly was cooled for 15 seconds to provide the weldable pad material.

The weldable pad material so obtained has shown a peeling strength of 5.7 kg per 3 cm. which is sufficient for the weldable pad material to be placed into practical use. Moreover, since some of the bonding particles were uniformly distributed in a portion of the open-celled structure of the polyurethane foam sheet 2 other than the portion where fusion-bonding had been effected, the cushioning effect intrinsic of the polyurethane foam could be preserved.

Example II

Figure 2:
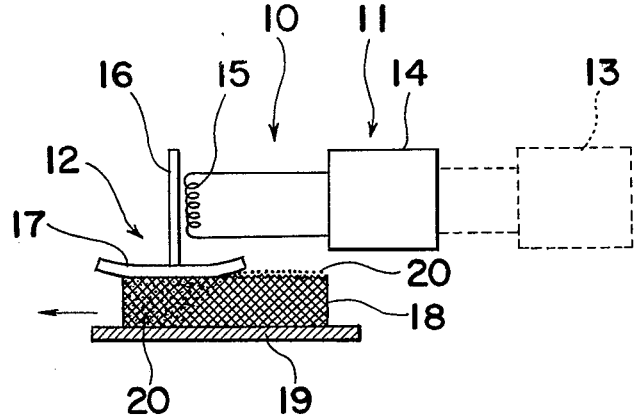
FIG. 2 is a schematic diagram showing the use of an electromechanical vibrator as a source of vibration in the practice of the method of the present invention.
Figure 3:
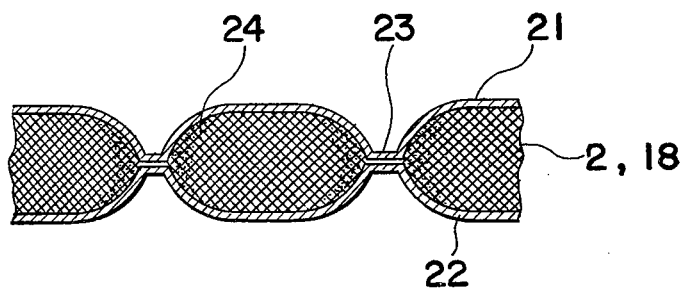
FIG. 3 is a schematic cross sectional representation of a portion of a patterned cushioning product of flexible polyurethane foam manufactured according to the method of the present invention.

A weldable pad material similar to that obtained in Example I was manufactured by the use of an electro-mechanical vibrator 10 of a construction shown in FIG. 2. The vibrator 10 comprises a power source section 11, including an oscillator 13 and an amplifier 14, and a vibration applying section 12 including an exciting coil 15, a vibration transmitting rod 16 and a vibrating plate 17 made of juralumin and secured to one end of the vibration transmitting rod 16 remote from the exciting coil 15. The vibrating plate 17 employed was 1 mm. in thickness and 30 mm. in both width and length.

A sheet 18 of flexible polyurethane foam of open-celled structure, having a thickness of 10 mm. and a specific gravity of 0.02 g/cm³, was first placed on a moving support 19 driven in one direction, as indicated by the arrow in FIG. 2, at a speed of 1.5 m/min. and, while the polyurethane foam sheet 18 was so transported together with the support 19, a powder 20 of the same thermally fusible bonding agent as in Example I was spread over one surface of the polyurethane foam sheet 18 to form thereon a localized layer of bonding agent having a width of 20 mm. Then, the vibrating plate 17 was applied under a slight pressure to the bonding layer on the surface of the polyurethane foam sheet 18 and, subsequently, vibrations were applied thereto. During the application of the vibrations, the frequency and amplitude of the vibrations applied were varied in such various combinations as shown in the table, the results of application of vibrations of different combinations of frequency and amplitude being also shown in the table.

Of these samples listed in the table, each of the samples No. 6 and No. 7 was subsequently heated at 150° C. for 3 minutes within a heating oven to allow the particles of the bonding agent to be fixed in the open-celled structure of the polyurethane foam sheet. After removal of the polyurethane foam sheet out of the heating oven, a web of nylon tricot and a web of nonwoven nylon fabric, both as the surface covering sheets, were applied to the opposed surfaces of the polyurethane foam sheet, that is, each of the samples No. 6 and No. 7, and, while the polyurethane foam sheet had been sandwiched between these surface covering sheets, the assembly was heated in a manner similar as in Example I and then cooled as in Example I.

The resultant product, that is, the weldable pad material, has shown that the cushioning effect intrinsic of the polyurethane foam could be preserved.

TABLE

| SAMPLE NUMBER | FREQUENCY (Hz) | AMPLITUDE (μm) | DEPTH OF PERMEATION (mm.) | PRESENCE OF SCATTERING OF POWDERY PARTICLES |
|---|---|---|---|---|
| 1 | 50 | 1,500 | 4 | small amount |
| 2 | 80 | 1,500 | 5 | " |
| 3 | 100 | 500 | 4 | substantially not |
| 4 | 100 | 1,500 | 8 | small amount |
| 5 | 200 | 500 | 10 | substantially not |
| 6 | 500 | 100 | 10 | no |
| 7 | 1,000 | 50 | 10 | no |
| 8 | 1,000 | 10 | 8 | no |
| 9 | 1,000 | 5 | 5 | no |

As hereinbefore fully described, according to the present invention, by the application of vibrations using a ultrasonic generator or an electromechanical vibrator as a source of vibrations, uniform permeation of the powdery particles without accompanying any possible lateral dispersion can advantageously be achieved. Moreover, since the powdery particles are uniformly permeated in a direction parallel to the direction of thickness of the polyurethane foam sheet, the subsequent fusion-bonding does not result in an undesired reduction in physical properties intrinsic of the polyurethane foam.

Although the present invention has fully been described by way of the examples, it is to be noted that various changes and modifications are apparent to those skilled in the art. Such changes and modifications are to be understood as included within the true scope of the present invention unless they depart therefrom.

We claim:

1. A method of manufacturing a flexible polyurethane foam product which comprises the steps of applying a mass of thermally fusible particles of a bonding agent in a predetermined pattern on one surface of a sheet of flexible polyurethane foam having an open-celled structure; causing the bonding particles to permeate into the open-celled structure of the polyurethane foam sheet by the application of high frequency vibrations to the bonding particles so as to be uniformly distributed in said open-celled structure, wherein said applied vibrations have a frequency and an amplitude within the range of 1,000 to 50,000 Hz and 5 to 100 μm, respectively, applying heat to cause the permeated bonding particles to be fixed in said open-celled structure of the polyurethane foam sheet; and fusion-bonding surface covering sheets onto the opposed surfaces of the polyurethane foam sheet with the bonding particles contained therein.

2. A method as claimed in claim 1, wherein the vibrations are generated by an ultrasonic generator.

3. A method as claimed in claim 1, wherein the vibrations are generated by an electromechanical vibrator.

4. A method as claimed in claim 2, wherein said vibrations are applied through a vibrating element operatively coupled to the ultrasonic generator on one hand and applied under a slight pressure to a layer of the bonding particles spread on the one surface of the polyurethane foam sheet.

5. A method as claimed in claim 3, wherein said vibrations are applied through a vibrating element operatively coupled to the electromechanical vibrator on one hand and applied under a slight pressure to a layer of the bonding particles spread on the one surface of the polyurethane foam sheet.

6. An article of manufacture manufactured by applying a mass of thermally fusible particles of a bonding agent in a predetermined pattern on one surface of a sheet of flexible polyurethane foam having an open-celled structure; causing the bonding particles to permeate into the open-celled structure of the polyurethane foam sheet by the application of high frequency vibrations to the bonding particles so as to be uniformly distributed in said open-celled structure; wherein said applied vibrations have a frequency and an amplitude within the range of 1,000 to 50,000 Hz and 5 to 100 μm, respectively; applying heat to cause the permeated bonding particles to be fixed in said open-celled structure of the polyurethane foam sheet; and fusion-bonding surface covering sheets onto the opposed surfaces of the polyurethane foam sheet with the bonding particles contained therein.

* * * * *